United States Patent [19]

Rudd et al.

[11] Patent Number: 4,916,278

[45] Date of Patent: Apr. 10, 1990

[54] SEVERING METAL STRIP WITH HIGH FREQUENCY ELECTRICAL CURRENT

[75] Inventors: Wallace C. Rudd, New Canaan; Humfrey N. Udall, Darien, both of Conn.

[73] Assignee: Thermatool Corporation, Stamford, Conn.

[21] Appl. No.: 402,090

[22] Filed: Sep. 1, 1989

[51] Int. Cl.⁴ .......................... H05B 6/02; B26D 7/10
[52] U.S. Cl. ................................. 219/10.41; 219/7.5; 219/68; 148/9 R; 148/154; 83/16
[58] Field of Search ...................... 219/7.5, 6.5, 10.41, 219/10.43, 10.57, 68; 148/9 R, 154, 112; 75/10.14; 83/15, 16, 170

[56] References Cited

U.S. PATENT DOCUMENTS

| | | | |
|---|---|---|---|
| 3,794,805 | 2/1974 | Rudd | 219/7.5 X |
| 4,007,349 | 2/1977 | Burley | 219/10.43 |
| 4,537,102 | 8/1985 | Balzer | 83/16 |
| 4,554,029 | 11/1985 | Schoen et al. | 148/112 |

*Primary Examiner*—Philip H. Leung
*Attorney, Agent, or Firm*—Brooks Haidt Haffner & Delahunty

[57] ABSTRACT

A method of severing a metal piece into parts in which electrical contacts engage the piece at the end of the severing line and high frequency electrical current is fed to the contacts for the length of time required to at least significantly reduce the tensile strength of the metal along the line, the current being fed to at least one of the contacts through a proximity conductor overlying the line. After such heating of the metal, the portions of the piece can merely be pulled apart. If shaping of the edge faces is desired, they can be pressed together while heated and malleable and after separation or can be pressed against an anvil while heated and malleable. Before separation, the portions on opposite sides of the line can be pushed toward each other or be moved transversely to each other. If the metal along the line is heated to "burning" temperature, the portions can be separated by burning out the heated metal with an oxygen containing gas.

12 Claims, 2 Drawing Sheets

SEVERING METAL STRIP WITH HIGH FREQUENCY ELECTRICAL CURRENT

This invention relates to the dividing or severing of a metal piece, such as a sheet, strip or plate, into parts with the heating of the metal piece by high frequency electrical current along the line where parts of the piece are to be separated from each other.

BACKGROUND OF THE INVENTION

It is known in the art to heat the abutting faces of metal parts to forge welding temperature along a line by means of high frequency electrical current supplied to a first contact engaging one part, or the parts, at one end of the line and through a proximity conductor overlying the line, to a second contact engaging the one part, or the parts, at the other end of the line, and then, to force the parts together along the line to form a forge weld between the parts. See, for example, U.S. Pat. No. 3,591,757. In general, the frequency of the current is selected so that when the parts are overlapping, the reference depth of the current in the part nearer the proximity conductor is greater than the thickness of such part. When the parts are in end abutting relation, the reference depth is at least equal the thickness of the abutting ends. The meaning of "reference depth", or "depth of penetration" is set forth in said patent, and reference depths for several metals at current frequencies of 10 KHz and 450 KHz are also set forth in said patent.

The object of the methods set forth in said U.S. Pat. No. 3,591,757 is to weld two metal parts together. There is also a need in the industry to cut larger pieces of metal into smaller pieces, and the edge faces of the smaller pieces need not, in many cases, particularly if the edge faces are to be subsequently welded to another part or parts, be relatively smooth or precisely perpendicular to the major faces of the pieces. In the prior art, the larger piece has been cut or severed by mechanical means, such as by saws or shears, or by gas torches. These processes are relatively slow and use equipment subject to relatively rapid wear or result in undesirable environmental conditions.

BRIEF SUMMARY OF THE INVENTION

In accordance with the invention, apparatus and electrical conditions of the type set forth in said patent are employed to heat a metal piece to be severed into smaller pieces, or parts, to a temperature at which its tensile strength is substantially reduced, but below its melting temperature, along a line where the severing is to occur. In the preferred embodiments of the invention, the portions of the heated piece at opposite sides of the line are pulled apart while the metal along the line is of reduced tensile strength to separate such portions from each other. In this way, depending upon the thickness of the metal, a larger metal piece can be severed into two pieces in from one to three seconds without mechanical cutting and without any substantial adverse environmental effects.

Since the metal at parting line tends to "neck down" as the portions of the metal piece at opposite sides of the parting line are pulled apart, the invention also provides methods for reforming the edge faces while they are still relatively soft. In one method, the portions are pushed toward each other before they are pulled apart. In another method, the edge faces are pushed toward each other after the portions are pulled apart. In a further method, the edge faces are pushed against an anvil after the portions are pulled apart. In a still further method, the portions are moved transverse to the direction in which they are pulled apart before they are pulled apart.

In an alternative, less preferred, embodiment of the invention, the pieces at opposite sides of the line of heating are not pulled apart after the metal has been heated to cause separation of the pieces. Instead, a jet of oxygen is directed on the heated metal to "burn" out the heated metal leaving a gap between the pieces.

BRIEF DESCRIPTION OF THE DRAWINGS

The invention will be better understood from the detailed description of preferred embodiments thereof set forth hereinafter, which description should be considered in conjunction with the accompanying drawings in which.

DETAILED DESCRIPTION OF THE INVENTION

Figure 1:
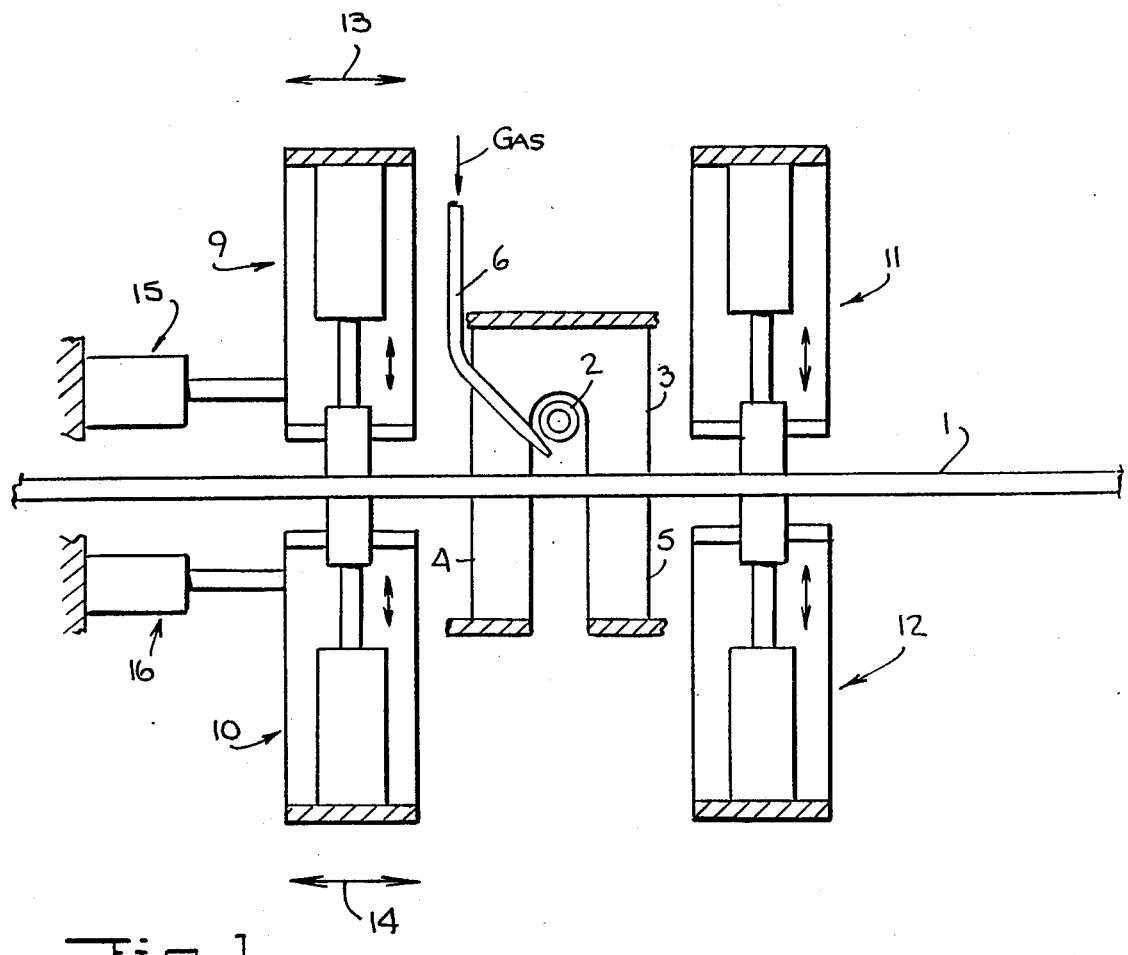
FIG. 1 is a schematic, side elevation view of apparatus which can be employed in the method of the invention.
Figure 2:
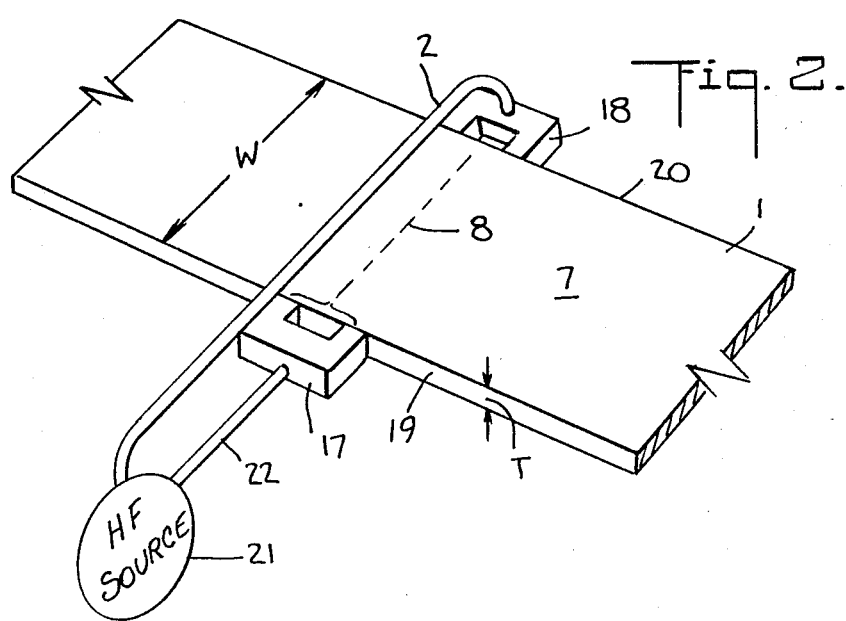
FIG. 2 is a schematic, perspective view of the proximity conductor and contacts of FIG. 1 in association with a plate or strip of metal to be severed.

FIG. 1 illustrates, diagrammatically, apparatus for performing the methods of the invention and FIG. 2 illustrates, diagrammatically, the electrical portion of the apparatus in an association with a metal piece to be severed into parts.

In FIG. 1, a metal piece 1 to be severed into two parts or portions is inserted beneath a proximity conductor 2, which can be copper tubing and be water cooled, with the portion thereof at which the piece 1 is to be severed beneath the proximity conductor 2. The conductor 2 should be as close as possible to the line along which the piece 1 is to be severed consistent with mechanical and electrical requirements.

Preferably, in order to further concentrate the heating current along the line of severance, the conductor 2 is partly surrounded by a stack of laminations 3 of magnetic material. Supports 4 and 5, preferably of a low heat conductivity, are disposed at the side of the piece 1 opposite from conductor 2 and at opposite sides of the line of severance.

If considered to be desirable, to prevent oxidation of the metal of the piece 1, the space within the laminations 3 may be supplied with an inert gas or hydrogen gas through one or more tubes 6 extending into such space and connected to a conventional source (not shown) of such gas. In an embodiment of the method described hereinafter, the gas supplied by tube 6 can be oxygen or an oxygen containing gas.

The metal piece 1 has a predetermined width W (see FIG. 2) and a predetermined thickness T, the width W being less than the length of the conductor 2. The piece 1 has a major surface 7.

The metal piece 1 may be made of various materials, but in view of the fact that the reference depth of electrical currents is relatively small in metals other than steel, (see Col. 7 of said Pat. No. 3,591,757), and therefore, pieces of metal other than steel must be relatively thin for the purposes of the invention and can be readily sheared, the methods of the invention are principally applicable to steel pieces.

As is known in the art, the electrical current flowing in a metal part concentrates as closely as possible to the proximity conductor when the current in the proximity conductor flows, at any instant, in a direction opposite to the direction of current flow in the metal part. Thus, the heating pattern in the metal part has the shape of the projection of the proximity conductor on the part. The invention will be described in connection with a rectilinear proximity conductor 2 which will produce heating of the metal piece 1 along a rectilinear severing line 8 indicated by a dashed line in FIG. 2. However, it is to be understood that if the severing line is not to be rectilinear, the conductor 2 may have other configurations such as arcuate, sinusoidal, saw tooth, etc., in a plane parallel to the major surface 7. See, for example, the configurations shown in FIGS. 7, 8, 9 and 15 of said U.S. Pat. No. 3,591,757.

After the metal piece 1 is positioned as described and as illustrated in FIG. 1, it is held in position by diagrammatically illustrated, known, fluid operable, clamping assemblies 9, 10, 11 and 12. For purposes hereinafter described, the assemblies 9 and 10 are movable in the directions of the arrows 13 and 14 by fluid operable piston and cylinder assemblies 15 and 16. Although in the embodiment of the apparatus shown in FIG. 1, the assemblies 11 and 12 are fixed in horizontal position and the assemblies 9 and 10 are movable horizontally, the assemblies 11 and 12 can also be movable horizontally by assemblies like the assemblies 15 and 16.

FIG. 2 illustrates bifurcated contacts 17 and 18 which engage the side faces 19 and 20 of the piece 1. Thus, the legs of the contacts 17 and 18 respectively engage the side faces 19 and 20 at opposite sides of the severing line 8. However, if desired, other types of contacts can be used, such as a single contact at each end of, and centered on, the severing line 8.

After the metal piece 1 has been position as described and the contacts 17 and 18 are moved into engagement with the side faces 19 and 20, a current of a frequency which will provide a reference depth in the metal of the piece 1 at least substantially equal to the thickness T is supplied from a high frequency source 21 to the contact 17 through a lead 22 and to the contact 18 through the proximity conductor 2 overlying the severing line 8 for the time necessary to heat the metal along the line 8 to a temperature at which the tensile strength of the heated metal is significantly reduced, e.g. to about 10% of its strength at room temperature. Normally, for steel, the temperature would be that used for forging or hot working of the steel. For example, for carbon steel, the temperature would be in the range from about 1600° to about 2000° F. and at such temperature, the tensile strength of the heated metal would be about 10% of its tensile strength at room temperature. At lower temperatures, a higher separating force is required, and at higher temperatures in the range, a significant reduction in the separating force is not obtained.

The length of time during which the metal is subjected to heating current depends on the size of the source, the thickness T and the metal of the piece 1. For example, with a piece of steel 7 ⅜ in. wide and ⅛ in. thick and a source 21 operating at 9 KHz and which provides approximately 90 kilowatts to the piece 1, the heating time was one second to produce sufficient softening of the metal. The reference depth, when the metal is heated above the Curie point, was approximately 0.25 in.

While a frequency having a reference depth at least equal to the thickness T is preferred, a frequency having a reference depth slightly less, e.g. 10% less, than the thickness T can be used with longer times of heating because even though the current in the portion of the metal below the reference depth is smaller, heat is transmitted to such portion by conduction. In general, and except for the embodiment described hereinafter, the reference depth, power and heating time are selected so that the metal is reduced in tensile strength, or softened, throughout its thickness along the heating or severing line without causing any of the metal to become molten. Normally, the metal will be heated along the severing line to a few hundred degrees below its melting point, and a typical temperature for steel is in the range from 1600° F. to 2000° F.

Figure 3:
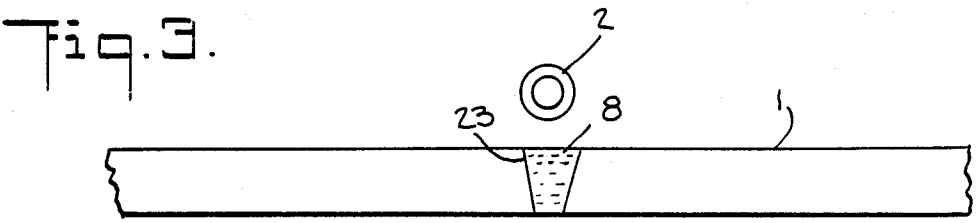
FIG. 3 is a side elevation view of the embodiment shown in FIG. 2 with components omitted and illustrates the heating of a plate or strip of metal to be severed.

FIG. 3 illustrates the heating pattern produced with the method of the invention. Thus, along the severing line 8, the metal is heated in the shaded heating pattern 23 which is wider nearer the proximity conductor 2 and narrower at the lower surface of the piece 1.

Figure 4:
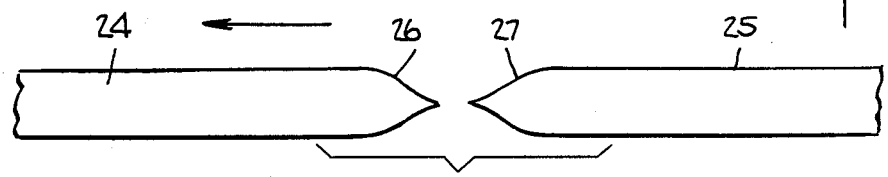
FIG. 4 is a side elevation view illustrating the shape of the plate or strip ends after the metal has been heated and the portions of the plate or strip on opposite sides of the heated area have been merely pulled apart.

After the metal has reached softening temperature, the portions of the metal piece 1 on opposite sides of the severing line 8 are separated from each other. If they are merely pulled apart by actuating the assemblies 15 and 16, the facing end surfaces of the portions will generally be tapered as illustrated in FIG. 4 which may be acceptable for some purposes. As shown in FIG. 4, the portions 24 and 25 have tapered end surfaces 26 and 27.

Figure 5:
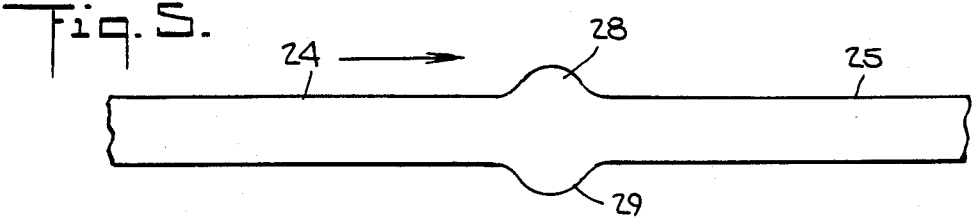
FIG. 5 is a side elevation view illustrating the shaping of the heated metal either prior to pulling the portions of the plate or strip apart or after such portions have been pulled apart and then pushed together while the facing ends are hot enough to be relatively easily reformed.
Figure 6:
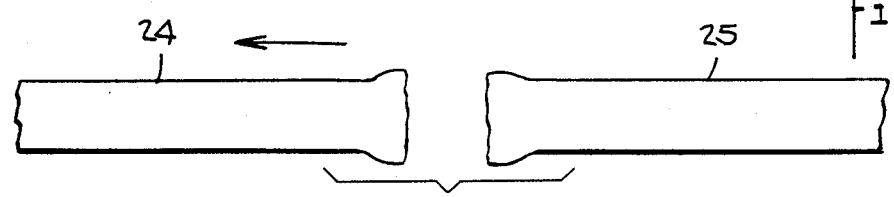
FIG. 6 is a side elevation view illustrating the shape of the ends of the metal portions after the ends have been reformed as shown in FIG. 5 and the portions are pulled apart.

The end surfaces may be treated in several ways to improve the shape of the end surfaces. For example, while still heated and malleable, e.g. at a temperature at which it can be deformed without deforming the metal adjacent to the heated metal, the facing end surfaces may be pushed toward each other to create bulges 28 and 29 of metal as shown in FIG. 5, and then again pulled apart to provide end surfaces having the shapes shown in FIG. 6. Alternatively, prior to pulling the portion 24 away from the portion 25, and after heating the metal to the reduced tensile strength, or softening, temperature, the portion 24 may be pushed toward the portion 25 creating the bulges 28 and 29 shown in FIG. 5. Thereafter, the portion 24 is pulled away from the portion 25 producing edge surfaces of the shape shown in FIG. 6.

Figure 7:
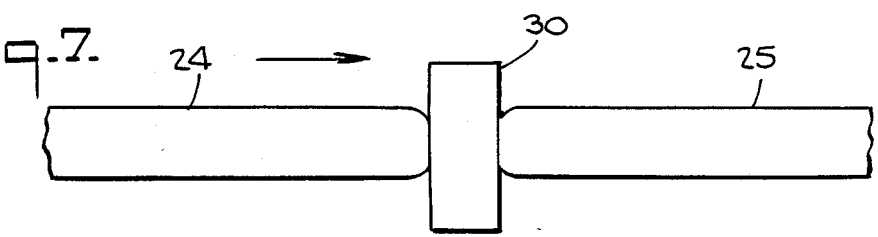
FIG. 7 is a side elevation view illustrating the shaping of the ends of the metal portions by pressing the ends against an anvil while such ends are hot enough to be easily reformed.

In another method for shaping the edge surfaces 26 and 27, the edge surfaces, while still heated and malleable, are pressed against the planar faces of an anvil 30. Thus, after the portions 24 and 25 are separated, an anvil 30 can be inserted between the faces 26 and 27 and the portion 24 can be pushed toward the anvil 30 which, in turn, presses against the face 27 and modifies the edge faces as illustrated in FIG. 7. Of course, both portions 24 and 25 may be pushed toward the anvil 30, and if desired, the portions 24 and 25 may be quickly moved to separate pushing apparatus with a fixed anvil for forming the edge surfaces 26 and 27.

Figure 9:
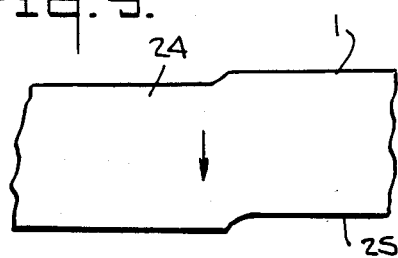
FIGS. 9 and 10 are plan views illustrating the severing of the metal plate or strip by first laterally moving the portions on opposite sides of the heated metal and then pulling such portions apart.
Figure 10:
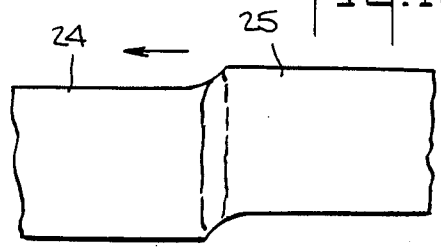

Another method for modifying the shapes of the edge surfaces is illustrated in FIGS. 9 and 10. In this method, after the metal along the severing line 8 has been heated to its softening temperature, the portion 24, the portion 25 or both is moved in a direction transverse to the length of the piece 1 by a small amount, as shown in FIG. 9, and then, the portion 24 is pulled away from the portion 25 as shown in FIG. 10.

Although, in the preferred methods described, the portions are separated in a direction parallel to the plane of a major surface 7 of the metal piece 1, it will be apparent that they can be separated in another direction, e.g. transversely to the plane of the surface 7.

If edge surfaces at the point of separation of the type which are obtained by torch "burning" are acceptable, the method of the invention can be modified to separate the portions of the metal piece 1 without pulling one portion with respect to the other. In the modified method, the metal of the piece 1 is heated along the severing line 8 by the apparatus and electrical current described to a temperature at which it will "burn", and while the portions 24 and 25 are held in fixed positions, a stream of oxygen, or oxygen containing gas, is directed on the hot metal, such as by way of tube 6, or additional tubes 6, causing the hot metal to drop or "burn" out. For example, with carbon steel, the temperature would typically be 2000° F. but can be as high as the melting temperature thereof. With carbon steel, the reaction of oxygen therewith does not become exothermic until the temperature is at least 1600° F. Therefore, with temperatures below about 1600° F., the oxygen would merely tend to cool the heated metal, and the temperature should be at least about 1600° F. so that the steel would "burn" in a selfsustaining reaction.

Figure 8:
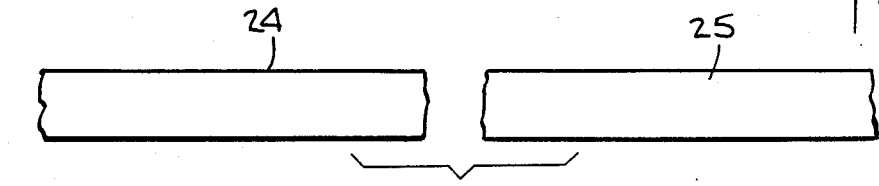
FIG. 8 is a side elevation view of the ends of the metal portions when the heated metal has been removed by subjecting it to a gas such as oxygen.

FIG. 8 illustrates the portions 24 and 25 after such "burning". With this method, pulling apparatus can be omitted, the metal piece 1 merely being clamped during the separation of the portions 24 and 25.

Although preferred embodiments of the present invention have been described and illustrated, it will be apparent to those skilled in the art that various modifications may be made without departing from the principles of the invention.

We claim:

1. A method for severing a metal piece into parts on opposite sides of a line between the parts, said metal piece having a predetermined width transversely to its length and a predetermined thickness at said line, said method comprising:
    engaging said metal piece at one end of said line with a first contact and at the other end of said line with a second contact;
    supplying electrical current of a frequency which provides a reference depth in the metal of said metal piece which is at least equal to 90% of the thickness of said metal piece along said line to said first contact through a conductor adjacent said line but spaced from said metal piece and to said second contact, to cause heating of said metal piece along said line;
    maintaining the supply of said electrical current to said first contact and said second contact and the heating of the metal of said metal piece until the metal along said line reaches a temperature at least equal to a temperature at which there is a significant reduction in the tensile strength of said metal along said line as compared to the tensile strength of the metal adjacent thereto; and
    separating said parts along said line.

2. A method as set forth in claim 1 wherein the metal of said metal piece is heated along said line to said temperature and then, the parts are separated by moving at least one of the parts in the direction transverse to said line.

3. A method as set forth in claim 2 wherein said parts are separated by pulling at least one of the parts in a direction substantially parallel to the plane of the major surface of said metal piece and away from the other of said parts.

4. A method as set forth in claim 3 wherein prior to separating said parts, at least one of said parts is pushed toward the other of said parts to cause the metal along said line to increase in thickness relative to the thickness of the metal adjacent but spaced from said line.

5. A method as set forth in claim 3 wherein after said parts have been separated and while the metal thereof at the facing edge surfaces of the parts is still heated and malleable, each of said facing edge surfaces is pressed against a surface having the shape desired at said facing edge surfaces to modify the shape of said facing edge surfaces.

6. A method as set forth in claim 5 wherein an anvil having oppositely facing, rigid surfaces is inserted between said facing edge surfaces and said facing edge surfaces are pressed against the surfaces of said anvil.

7. A method as set forth in claim 3 wherein prior to separating said parts, at least one of said parts is moved in the direction of the width of said metal piece.

8. A method as set forth in claim 3 wherein after said parts have been separated and while the metal thereof at the facing edge surfaces is still heated and malleable, at least one of the parts is pushed toward the other to cause the facing edge surfaces to engage and modify in shape.

9. A method as set forth in claim 1 wherein said temperature is the temperature at which the metal along said line has a tensile strength substantially equal to 10% of the tensile strength thereof at room temperature.

10. A method as set forth in claim 1 wherein the metal of said metal piece is carbon steel and said temperature is at least 1600° F. but below the melting temperature thereof.

11. A method as set forth in claim 10 wherein said temperature is in the range from about 1600° F. to about 2000° F.

12. A method as set forth in claim 1 wherein the metal of said metal piece is heated along said line at least to a temperature at which it will combine with oxygen in an exothermic reaction and said parts are separated by directing a gas containing oxygen on the metal at the last-mentioned said temperature to remove the latter metal.

* * * * *